United States Patent [19]
Storey et al.

[11] Patent Number: 5,687,988
[45] Date of Patent: Nov. 18, 1997

[54] AIRBAG CUSHION AND AIRBAG INFLATOR RETENTION DEVICE

[75] Inventors: J. Kirk Storey, Farmington; Michael P. Jordan, South Weber; Brent K. Olson, Clearfield, all of Utah

[73] Assignee: Morton International, Inc., Chicago, Ill.

[21] Appl. No.: 682,281

[22] Filed: Jul. 17, 1996

[51] Int. Cl.⁶ .......................... B60R 21/22; B60R 21/26
[52] U.S. Cl. .................... 280/728.2; 280/730.2; 280/736
[58] Field of Search .................. 280/728.2, 730.2, 280/732, 730.1, 736, 740, 741, 742, 728.1

[56] References Cited

U.S. PATENT DOCUMENTS

| | | | |
|---|---|---|---|
| 4,153,273 | 5/1979 | Risko | 280/728.2 |
| 4,964,654 | 10/1990 | Bishop et al. | 280/728.2 |
| 5,234,227 | 8/1993 | Webber | 280/732 |
| 5,458,364 | 10/1995 | Mueller et al. | 280/728.2 |
| 5,468,012 | 11/1995 | Mihm | 280/728.2 |
| 5,498,025 | 3/1996 | Easter et al. | 280/728.2 |
| 5,498,029 | 3/1996 | Mossi et al. | 280/741 |
| 5,533,750 | 7/1996 | Karlow et al. | 280/728.2 |
| 5,558,363 | 9/1996 | Dahl | 280/728.2 |
| 5,564,739 | 10/1996 | Davidson | 280/730.2 |
| 5,611,563 | 3/1997 | Olson et al. | 280/728.2 |
| 5,613,704 | 3/1997 | White, Jr. et al. | 280/732 |

*Primary Examiner*—Peter C. English
*Attorney, Agent, or Firm*—George W. Rauchfuss, Jr.; Gerald K. White

[57] ABSTRACT

An inflator and cushion retaining device for mounting an airbag inflator and an airbag cushion within a motor vehicle. The inflator and cushion retaining device includes an elongated trough for receiving and supporting a sidewall of the airbag inflator. The trough extends from an endwall to an open end, and the endwall defines an opening for receiving a mounting stud extending from an end of the airbag inflator. At least one tooth extends into the opening from the endwall for catching the mounting stud and securing the mounting stud within the opening. A pair of arms extends from the trough adjacent the open end for wrapping around the inflator and securing the inflator within the trough. At least one rib protrudes inwardly from the trough adjacent the open end for spacing the sidewall of the inflator away from the trough. The inflation and cushion retaining device and the inflator are contained within an airbag cushion. Studs extend transversely to and outwardly from the outside of the trough and through openings in the airbag cushion for mounting the airbag cushion together with the inflator and cushion retention device and the airbag inflator, as part of an airbag module within a motor vehicle.

22 Claims, 3 Drawing Sheets

AIRBAG CUSHION AND AIRBAG INFLATOR RETENTION DEVICE

FIELD OF THE INVENTION

The present invention relates to an airbag module. More particularly, the present invention relates to an inflator and cushion retention device for mounting a side-impact airbag module including an airbag inflator and an airbag cushion within a motor vehicle.

BACKGROUND OF THE INVENTION

An airbag module is part of an inflatable restraint system that is employed in an automobile for protecting an occupant against injury by producing an inflated airbag cushion for physically restraining the occupant's body when the automobile encounters a collision. As its name implies, a side impact airbag module protects an occupant against an impact to the side of the automobile and is normally positioned somewhere between the occupant and the side of the automobile closest to the occupant. Because the side-impact airbag module is mounted within the seat, on the exterior of the seat, on a side door or on a side pillar of the automobile, the size of a side.-impact airbag module must be kept to a minimum.

The airbag module normally includes an airbag cushion and an inflator contained within a reaction canister. The inflator defines a plurality of gas exhaust ports and contains gas generant that, once triggered by a remote collision sensor, provides the inflation gas for inflating the airbag cushion. The inflator also contains filter material surrounding the gas generant. Ideally, the gas exhaust ports are deployed on all sides of the inflator to achieve neutral thrust and so that inflation gas from the gas generant can pass through a greater surface area of the filter material. The airbag cushion has an open reinforced mouth and is secured to the canister adjacent the inflator so that the open mouth is positioned over the gas exhaust ports. The airbag cushion is secured using fasteners such as bolts or sliding rods, for example.

Because a typical airbag module includes a separate module housing which mounts the airbag cushion, the airbag module requires more parts and may be larger than preferred for a side-impact airbag module. Providing a retention device for mounting an airbag inflator and an airbag cushion within a motor vehicle that dispenses with the need for a module housing to mount the airbag cushion would be useful and desirable.

SUMMARY OF THE INVENTION

An object, therefore, of the present invention is to provide an inflator and cushion retention device for mounting an airbag module including an airbag cushion and airbag inflator within a motor vehicle.

An additional object of the present invention is to provide an inflator and cushion retention device that is suitable for mounting the inflator within an airbag cushion.

A further object of the present invention is to provide an inflator and cushion retention device that acts as a diffuser for inflation gas exiting an airbag inflator.

In carrying out this invention, there is provided an inflator and cushion retention device for mounting an airbag inflator having an elongated sidewall extending from a first end to a second end. The inflator and cushion retention device comprises an elongated trough for receiving and supporting the airbag inflator. The trough has two opposing sides and a bottom, and extends from an endwall to an open end. An opening is defined by the endwall for receiving a mounting stud extending from the first end of the airbag inflator to support the inflator in the trough and to prevent the first end of the inflator from lifting out of the trough. At or near the second end of the trough, a first arm extends from one side of the trough and a second arm extends from the other side of the trough generally opposite the first arm, and the arms are sized to bend over the inflator and overlap. Means are provided for locking the first and second arms together to prevent the second end of the inflator from lifting out of the trough. At least one mount extends from the trough for mounting the inflator and cushion retention device and airbag inflator within a motor vehicle as part of an airbag module also including an airbag cushion.

According to one aspect of the present invention, the inflator and cushion retention device further includes means preventing the airbag inflator from sliding out of the open end of the trough. These means are provided as at least one tooth on one of the endwall or airbag inflator mounting stud.

According to another aspect of the present invention, the opening defined by the endwall for receiving the mounting stud of the inflator is positioned to support the sidewall of the inflator spaced-apart from the trough. A spacer supports the second end of the inflator within but spaced apart from the walls of the trough. Also, the spacer is provided as at least one rib extending inwardly from the trough generally adjacent the open end for spacing the sidewall of the inflator apart from the walls of the trough.

According to an additional aspect of the present invention, an airbag inflator assembly is provided. The assembly comprises an airbag inflator having an elongated sidewall extending from a first end to a second end and a mounting stud extending outwardly from the first end, and an inflation and cushion retention device as described above for mounting the airbag inflator.

According to a further aspect of the present invention, an airbag module is provided, and comprises an inflatable airbag cushion containing the aforementioned airbag inflator assembly and defining at least one aperture allowing the at least one mount extending from the trough to pass therethrough, such that the airbag inflator and inflator assembly is received with the airbag cushion and mounts the airbag cushion to a vehicle.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 3:
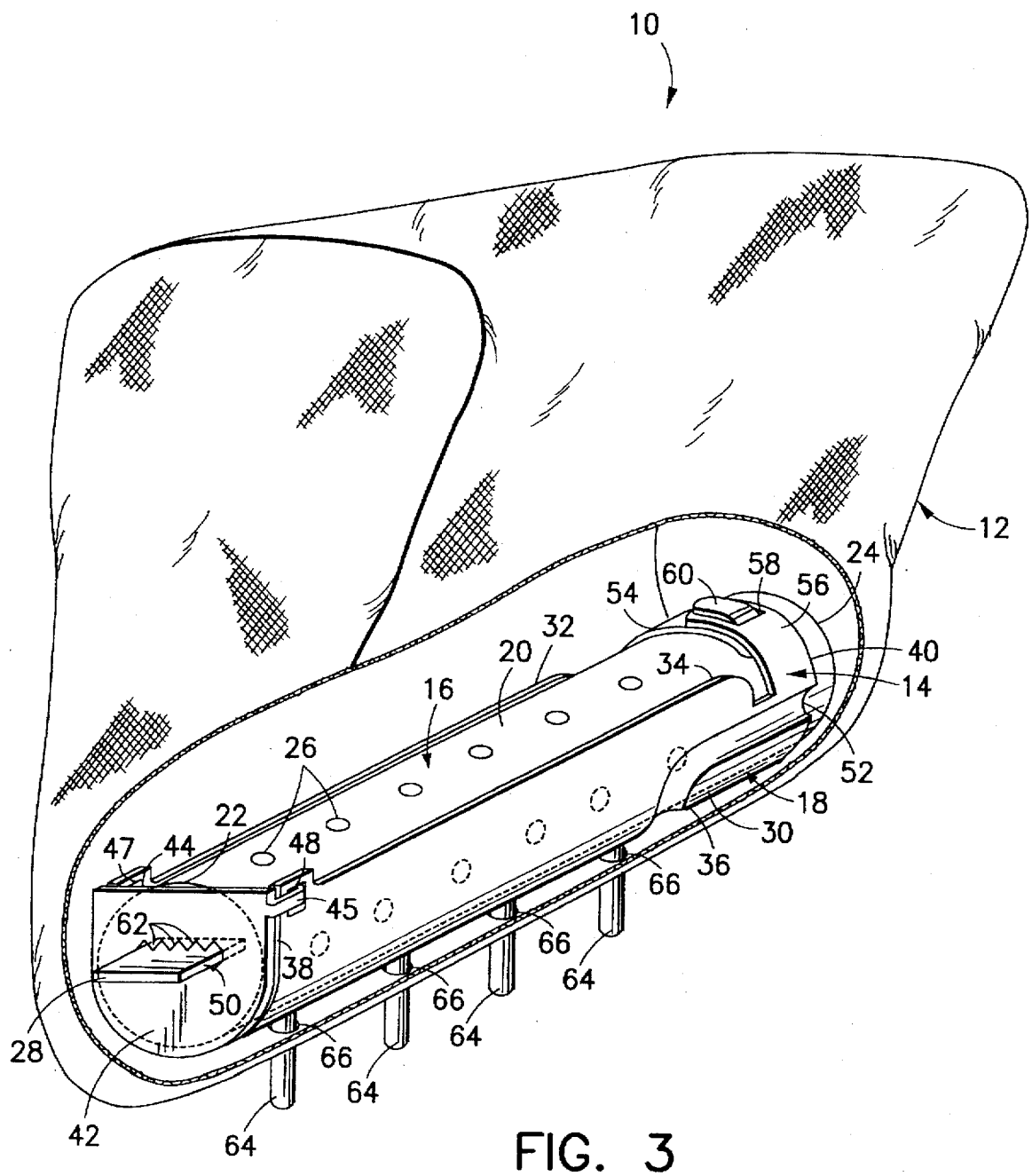
FIG. 3 is a perspective view, partially in section, of an airbag module according to the present invention including the airbag inflator assembly of FIG. 2 and an airbag cushion.

Referring first to FIG. 3, the present invention is directed to an airbag module generally represented by the reference numeral 10. The airbag module 10, as is known in the art, is for use in a motor vehicle as part of an inflatable restraint system and comprises an inflatable airbag cushion 12 and an airbag inflator assembly 14. The airbag inflator assembly includes an airbag inflator 16 and an inflator and cushion retaining device 18.

Figure 2:
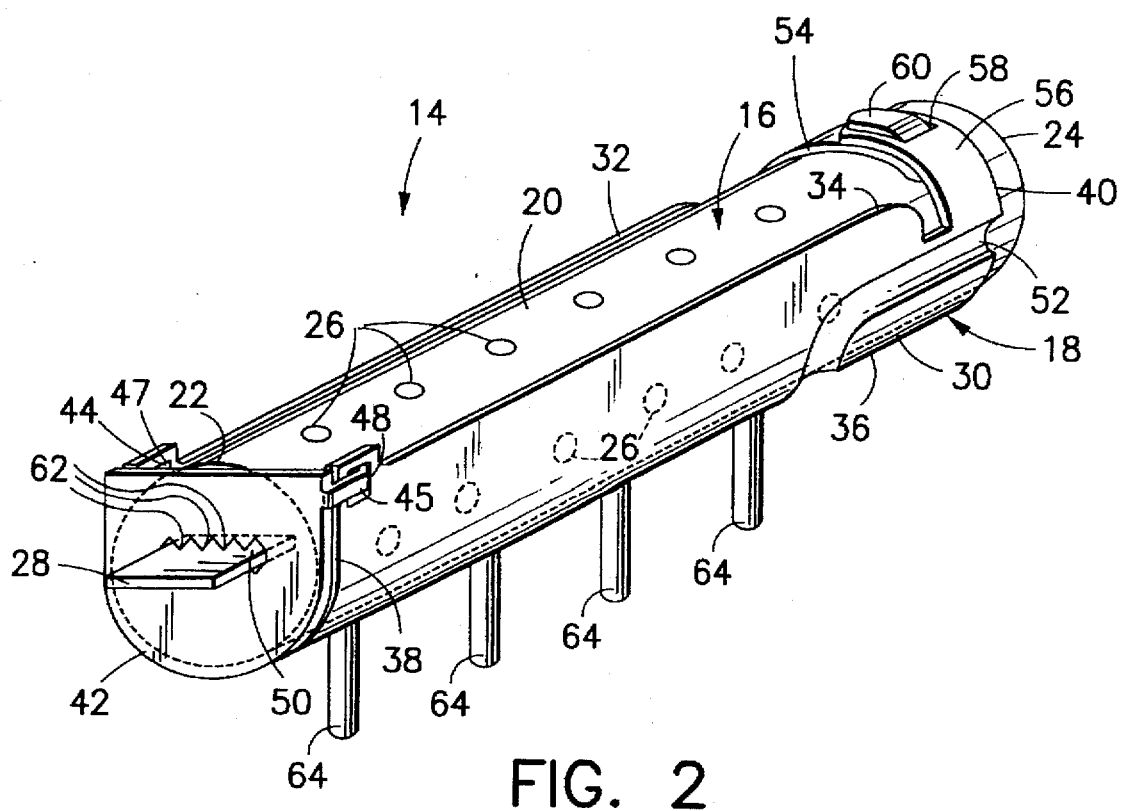
FIG. 2 is a perspective view of an airbag inflator assembly according to the present invention including the inflator and cushion retention device of FIG. 1 and an airbag inflator.

As shown also in FIG. 2, the airbag inflator 16 has an elongated cylindrical sidewall 20 extending from a first end 22 to a second end 24 and defining a plurality of gas exhaust ports 26. As is known in the art, the airbag inflator 16 contains a gas generant system that, when initiated, delivers inflation gas that exits the airbag inflator through the gas exhaust ports 26 for inflating the airbag cushion 12. A flat mounting stud 28 extends from the first end 22 of the inflator 16. Only the mounting stud 28, the sidewall 20 and gas exhaust ports 26 of the airbag inflator 16 are, however, related to the present invention and described in detail.

The inflator and cushion retention device 18 includes an elongated trough 30 receiving and supporting the sidewall 20 of the airbag inflator 16. The trough 30 has two opposing sides 32,34 extending upwardly from a bottom 36, and an end wall 42 closing a first end 38. The trough extends from the first end 38 to a second open end 40. The trough 30 and endwall 42 can be cut from a single flat piece of suitable material such as steel, for example, and then bent into final form. The endwall 42 has two tabs 44,45 that extend through two small holes 47,48 defined by the sides 32,34 of the trough 30 and are bent back to secure the endwall over the first open end 38 of the trough.

A generally rectangular opening 50 is defined by the endwall 42 and receives the flat mounting stud 28 of the airbag inflator 16 to prevent the first end 22 of the inflator from lifting out of the trough 30. The mounting stud and opening could alternatively be cylindrical and round, or other suitable shapes. The opening 50 is positioned so that the sidewall 20 of the inflator 16 is spaced-apart from the sides 32,34 and bottom 36 of the trough 30. A spacer comprising a rib 52 extends inwardly from the trough 30 and runs from the second open end 40 along the side 32, across the bottom 36 and along the other side 34 to the second open end. The rib 52 spaces the sidewall 20 of the inflator 16 apart from the sides and the bottom of the trough 30, and alternatively can comprise more than one rib or dimples. The sidewall 20 of the inflator 16 being spaced-apart from the trough 30 allows inflation gas to exit substantially all of the plurality of gas exhaust ports 26 unobstructed. The inflator and cushion retention device 18, therefore, provides for neutral thrust from the inflator 16 and allows the most efficient distribution of inflation gas through filter material (not shown) contained in the inflator.

Figure 1:
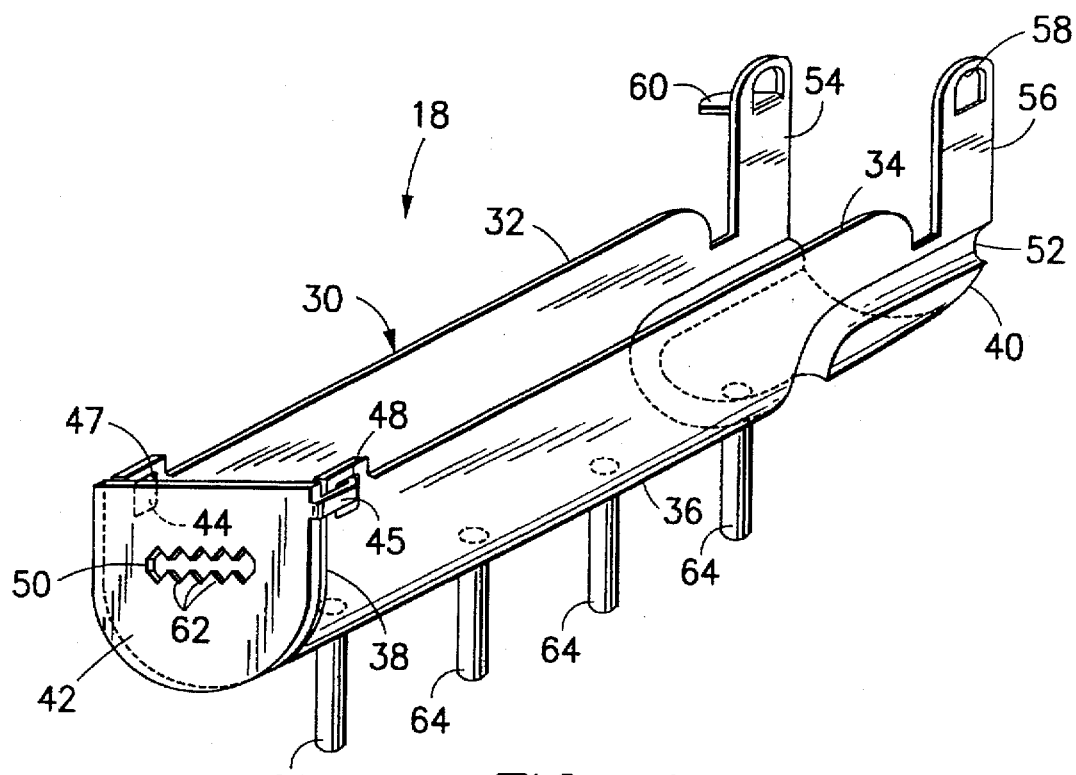
FIG. 1 is a perspective view of an inflator and cushion retention device according to the present invention.

As shown in FIG. 1, a first arm 54 is unitary with and extends from the side 32 of the trough 30 and a second arm 56 is unitary with and extends from the other side 34 of the trough generally opposite the first arm. The arms are located adjacent open end 40 of the trough. A tab 60 extends from the first arm, and an opening 58 is defined by the second arm. As shown in FIGS. 2 and 3, the arms 54,56 are bent over the sidewall 20 of the airbag inflator 16 and overlap. Means locking the first arm 54 and the second arm 56 together and preventing the second end 24 of the inflator 16 from lifting out of the trough 30 comprises the tab 60 of the first arm extending through the opening 58 in the second arm and being bent back.

Means preventing the airbag inflator 16 from sliding out of the second open end 40 of the trough 30 comprises a plurality of teeth 62 unitary with and extending from the endwall 42 of the trough 30 into the opening 50 defined by the endwall. The teeth 62 engage the mounting stud 28 of the airbag inflator 16 as the mounting stud is inserted into the opening 50 and secure the mounting stud within the opening.

Four mounts comprising studs 64 extend generally transversely to and outwardly from the trough 30 for mounting the airbag module 10 within a motor vehicle. The studs 64 are secured to the trough 30 by welding or another suitable method. As shown in FIG. 3, the airbag inflator assembly 14 of FIG. 2 is contained in the inflatable airbag cushion 12 which defines four apertures 66 allowing the four studs 64 extending from the trough 30 to pass therethrough for mounting the airbag module 10, including the airbag cushion, in a motor vehicle. The airbag cushion 12 can also define an aperture to allow a control wire to be connected to the inflator 16. The trough 30 of the inflator and cushion retention device 18 is shaped to diffuse inflation gas exiting the inflator 16 into the largest area of the airbag cushion 12. The airbag module 10, with the airbag cushion held in a folded position, can be deployed for side-impact protection and mounted interiorly within a seat of a motor vehicle with the studs 64 extending through a frame member of the seat and secured thereto with nuts, for example. The airbag cushion may be held in place by a tearable wrapper (not shown) and the airbag module 10 can also include a cover (not shown) and be mounted exteriorly to a seat. The inflator and cushion retention device 18, therefore, dispenses with the need for a module housing normally used in airbag modules for housing the inflator 16 and having the open mouth of an airbag cushion 12 attached thereto.

Figure 4:
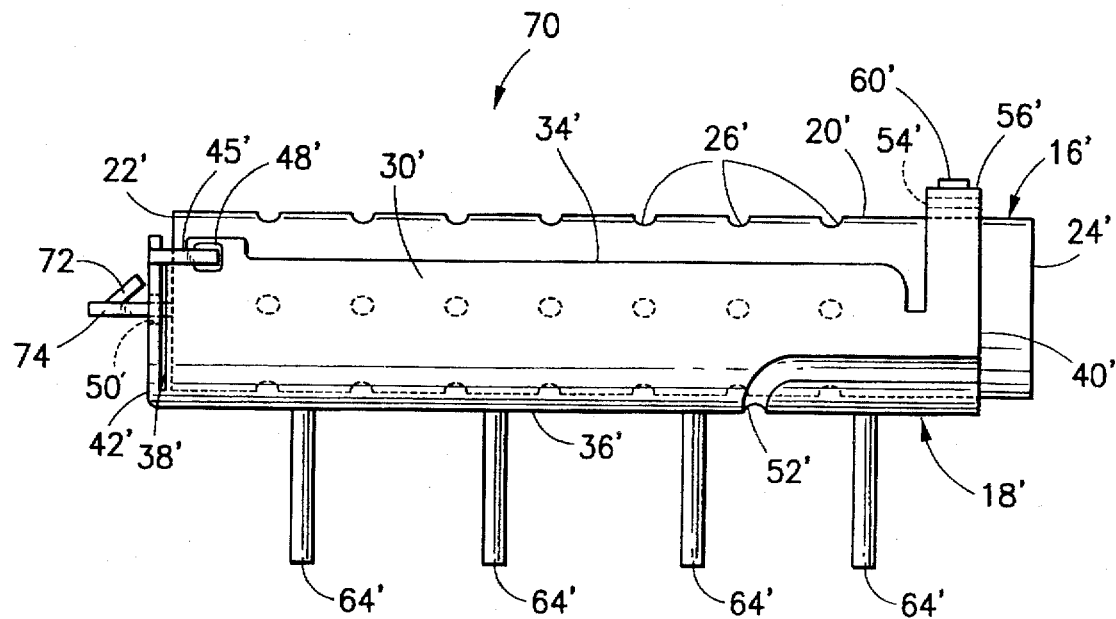
FIG. 4 is a side elevational view of another airbag inflator assembly according to the present invention.
Figure 5:
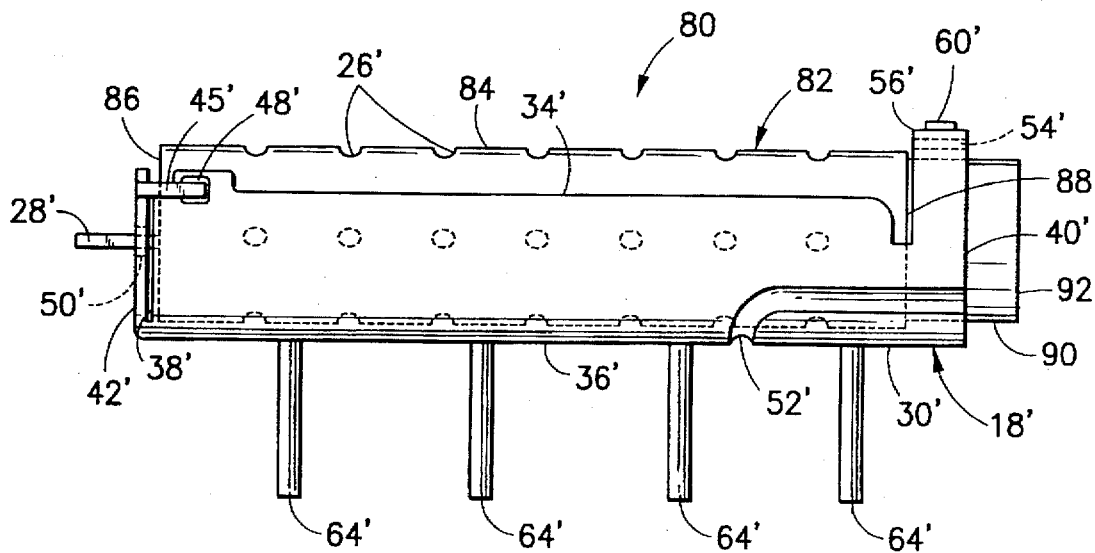
FIG. 5 is a side elevational view of an additional airbag inflator assembly according to the present invention.

Additional airbag inflator assemblies 70,80 according to the present invention are shown in FIGS. 4 and 5. The assemblies 70,80 are similar to the airbag inflator assembly 14 of FIGS. 2 and 3, and parts of the assemblies 70,80 which are the same or perform the same or similar function as the parts of the assembly 14 of FIGS. 2 and 3 have the same reference numerals but with a prime designation.

Referring to FIG. 4, the airbag inflator assembly 70 includes means preventing the airbag inflator 16, from sliding out of the second open end 40, of the trough 30, comprising a resilient tooth 72 extending outwardly from a mounting stud 74 of the airbag inflator. The tooth 72 is bendable and bends towards the mounting stud 74 to fit through the opening 50' defined by the endwall 42' as the tooth is inserted therein. Once through the opening 50', the tooth 72 springs back away from the mounting stud 74 to extend outwardly beyond the width of the opening and butt against the endwall 42' to prevent the mounting stud from being pulled out, thereby securing the mounting stud within the opening.

Referring to FIG. 5, the airbag inflator assembly 80 includes an inflator 82 having an elongated first sidewall 84 extending from a first end 86 to an inwardly extending shoulder 88, and a second sidewall 90, having a smaller outside diameter than the first sidewall, extending from the shoulder to a second end 92. Means preventing the airbag inflator 82 from sliding out of the second open end 40, of the trough 30, comprises the shoulder 88 which butts against the first arm 54, and second arm 56, wrapped over the second sidewall 90 of the inflator. The shoulder 88, in effect, provides a stop extending outwardly from the sidewall of the inflator 82 and butting against the first arm 54' and the second arm 56', and the stop could in the alternative comprise a dimple or flange extending from the inflator.

Since other features and structure varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. An inflator and cushion retention device for mounting an airbag inflator having an elongated sidewall extending from a first end to a second end with a mounting stud extending from the first end, the inflator and cushion retention device comprising:

an elongated open trough for receiving and supporting the sidewall of the airbag inflator, the open trough having two opposing sides, a bottom, an endwall and an open end opposite the endwall;

an opening defined by the endwall for receiving the mounting stud extending from the first end of the airbag inflator to prevent the first end of the inflator from lifting out of the trough;

a first arm extending from one side of the trough adjacent the open end opposite the endwall and a second arm extending from the other side of the trough generally opposite the first arm adjacent the open end opposite the endwall, the arms sized to bend over the inflator and overlap;

means for locking the first and second arms together to prevent the second end of the inflator from lifting out of the trough;

means for preventing the airbag inflator from sliding out of the open end of the trough; and at least one mount extending from the trough for mounting the inflator and cushion retention device and the airbag inflator within a motor vehicle as part of an airbag module also including an airbag cushion.

2. The inflator and cushion retention device of claim 1 wherein the means for preventing the airbag inflator from sliding out of the open end of the trough comprises at least one tooth extending from the endwall of the trough into the opening defined by the endwall for engaging the mounting stud of the airbag inflator and securing the mounting stud within the opening.

3. The inflator and cushion retention device of claim 2 wherein the means for locking the first arm and the second arm together comprises:

a tab forming a part of and extending from one of the first arm and the second arm; and an opening defined by the other of the first arm and the second arm for receiving the tab, whereby the tab is bendable to lock the first arm and the second arm together.

4. The inflator and cushion retention device of claim 2 wherein the opening defined by the endwall for receiving the mounting stud of the inflator is positioned to hold the sidewall of the inflator spaced-apart from the trough, and the inflator and cushion retention device further includes at least one spacer extending inwardly from the trough generally adjacent the open end for spacing the sidewall of the inflator apart from the trough.

5. The inflator and cushion retention device of claim 2 wherein the at least one mount comprises a stud extending generally transversely to and outwardly from the trough.

6. An airbag inflator assembly comprising:

A) an airbag inflator having an elongated sidewall extending from a first end to a second end and a mounting stud extending outwardly from the first end; and B) an inflator and cushion retention device including
1) an elongated open trough receiving and supporting the sidewall of the airbag inflator, the trough having two opposing sides and a bottom extending from an endwall to an open end,
2) an opening defined by the trough endwall receiving the mounting stud extending outwardly from the first end of the airbag inflator for preventing the first end of the inflator from lifting out of the trough,
3) a first arm extending from one side of the trough adjacent the open end opposite the endwall and a second arm extending from the other side of the trough generally opposite the first arm adjacent the open end opposite the endwall, the arms bent over the sidewall of the inflator and overlapping,
4) means locking the first and second arms together preventing the second end of the inflator from lifting out of the trough,
5) means preventing the airbag inflator from sliding out of the open end of the trough, and
6) at least one mount extending from the trough for mounting the inflator and cushion retention device and the airbag inflator within a motor vehicle as part of an airbag module also including an airbag cushion.

7. The airbag inflator assembly of claim 6 wherein the means locking the first arm and the second arm together comprises:

a tab forming a part of and extending from one of the first arm and the second arm; and an opening defined by the other of the first arm and the second arm for receiving the tab, with the tab bent back to lock the first arm and the second arm together.

8. The airbag inflator assembly of claim 6 wherein the opening defined by the endwall for receiving the mounting stud of the inflator is positioned so that the sidewall of the inflator adjacent the first end is spaced-apart from the sides and bottom of the trough, and the inflator and cushion retention device further includes at least one spacer extending inwardly from the trough generally adjacent the open end and spacing the sidewall of the inflator adjacent the second end apart from the trough.

9. The airbag inflator assembly of claim 6 wherein the at least one mount comprises at least one stud extending generally transversely to and outwardly from the trough.

10. The airbag inflator assembly of claim 6 wherein the means preventing the airbag inflator from sliding out of the open end of the trough comprises at least one tooth extending from one of the endwall of the trough or the mounting stud of the inflator and engaging the other of the endwall or the mounting stud for securing the mounting stud within the opening.

11. The airbag inflator assembly of claim 10 wherein the at least one tooth extends from the endwall of the trough.

12. The airbag inflator assembly of claim 10 wherein the at least one tooth extends from the mounting stud of the inflator.

13. The airbag inflator assembly of claim 6 wherein the means preventing the airbag inflator from sliding out of the open end of the trough comprises a stop extending from the sidewall of the inflator and butting against the bent over first and second arms.

14. The airbag inflator assembly of claim 13 wherein the stop comprises a shoulder defined by the sidewall of the inflator.

15. An airbag module comprising:

A) an airbag inflator assembly including
   1) an airbag inflator having an elongated sidewall forming gas exhaust ports and extending from a first end to a second end with a mounting stud extending from the first end, and
   2) an inflator and cushion retention device including an elongated open trough having two opposed sides, a bottom, an endwall and an open end opposite the endwall, an opening defined by the endwall receiving the mounting stud extending from the first end of the inflator for preventing the first end of the inflator from lifting out of the trough, said retention device mounting and supporting the airbag inflator therein with the elongated sidewall of the inflator spaced apart from the sides and bottom of the trough, a first arm extending from one side of the trough adjacent the open end opposite the endwall and a second arm extending from the other side of the trough generally opposite the first arm adjacent the open end opposite the endwall, the arms bent over the inflator and overlapping; means locking the first and second arms together to prevent the second end of the inflator from lifting out of the trough; means for preventing the airbag inflator from sliding out of the open end of the trough; and at least two spaced-apart studs extending from the bottom of the trough, and B) an inflatable airbag cushion containing the airbag inflator assembly and defining an aperture for each of the spaced-apart studs allowing the studs to extend from the trough through the airbag cushion for mounting the airbag inflator assembly and airbag cushion to a vehicle.

16. The airbag module of claim 15 wherein the means locking the first arm and the second arm together comprises:
   a tab forming a part of and extending from one of the first arm and the second arm; and
   an opening defined by the other of the first arm and the second arm receiving the tab, with the tab bent back locking the first arm and the second arm together.

17. The airbag module of claim 15 wherein the inflator and cushion retention device further includes at least one spacer extending inwardly from the trough generally adjacent the open end spacing the sidewall of the inflator adjacent the second end apart from the trough.

18. The airbag module of claim 15 wherein the means for preventing the airbag inflator from sliding out of the open end of the trough comprises at least one tooth extending from one of the endwall of the trough or the mounting stud of the inflator catching the other of the endwall or the mounting stud and securing the mounting stud within the opening for preventing the airbag inflator from sliding out of the open end of the trough.

19. The airbag module of claim 18 wherein the at least one tooth extends from the endwall of the trough.

20. The airbag module of claim 18 wherein the at least one tooth extends from the mounting stud of the inflator.

21. The airbag module of claim 15 wherein the means for preventing the airbag inflator from sliding out of the open end of the trough comprises a stop extending outwardly from the sidewall of the inflator and butting against the bent over first and second arms.

22. The airbag module of claim 21 wherein the stop comprises a shoulder defined by the sidewall of the inflator.

* * * * *